United States Patent [19]

Stephenson

[11] Patent Number: 4,656,585
[45] Date of Patent: Apr. 7, 1987

[54] AIRCRAFT FLIGHT DATA RECORDER DATA ACQUISITION SYSTEM

[75] Inventor: Edward A. Stephenson, Suquamish, Wash.

[73] Assignee: Sundstrand Data Control Inc., Redmond, Wash.

[21] Appl. No.: 576,538

[22] Filed: Feb. 3, 1984

[51] Int. Cl.$^4$ ............................................ G06F 15/20
[52] U.S. Cl. ..................................................... 364/424
[58] Field of Search ... 364/200 MS File, 900 MS File, 364/424; 360/5; 369/21

[56] References Cited

U.S. PATENT DOCUMENTS

| | | | |
|---|---|---|---|
| 3,344,406 | 9/1967 | Vinal | 364/900 |
| 3,461,429 | 8/1969 | Gray | 364/424 X |
| 3,581,014 | 8/1971 | Vogel et al. | 369/21 |
| 3,702,989 | 11/1972 | Provenzano, Jr. et al. | 364/200 |
| 4,027,289 | 5/1977 | Toman | 364/900 |
| 4,298,959 | 11/1981 | Sundermeyer et al. | 364/900 |
| 4,470,116 | 9/1984 | Ratchford | 364/424 |

OTHER PUBLICATIONS

A New All-Purpose Digital Flight Data Recorder, by P. H. Eason, presented at the "Proceedings of the Eleventh Symposium" Aircraft Integrated Data Systems (Deutsche Forschungs-und Versuchsanstalt fur Luft-und Raumfahrt), Sep. 22–24, 1981, Cologne, West Germany.

Primary Examiner—Thomas M. Heckler
Attorney, Agent, or Firm—Christensen, O'Connor, Johnson & Kindness

[57] ABSTRACT

A data acquisition system for use in an aircraft flight data recorder receives multiple analog and discrete signals representative of various aircraft parameters. A single address command from the flight data recorder central processing unit (CPU) causes a first multiplexer to select a set of analog signals. Each selected analog signal is amplified by a gain factor under CPU control and passed to track-and-hold circuitry which holds a level of the amplified analog signal upon receipt of a suitable command. The held analog signal levels are passed to a second multiplexer which also receives a set of discrete signals selected by a third multiplexer in response to a CPU address command. A control sequencer sequentially passes each signal at the input of the second multiplexer through an analog-to-digital converter, with the resultant digital signal being loaded into memory. After either all the selected and processed analog signals or the selected discrete signals have been analog-to-digital converted and stored in memory, the control sequencer issues an interrupt signal to the CPU.

30 Claims, 10 Drawing Figures

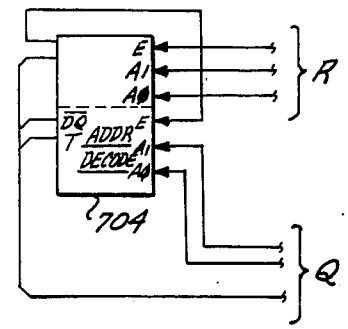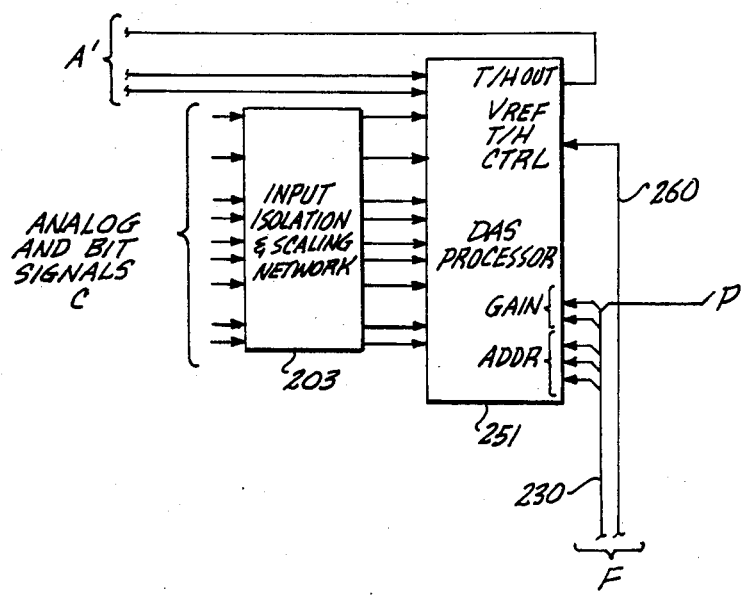
Fig. 4B.

AIRCRAFT FLIGHT DATA RECORDER DATA ACQUISITION SYSTEM

TECHNICAL FIELD

This invention relates to data acquisition systems for use with flight data recorders and, more particularly, to flight data acquisition systems for receiving flight data signals in a variety of signal forms.

BACKGROUND OF THE INVENTION

Flight data recorders are monitoring and recording instruments, carried aboard an aircraft, which systematically monitor and store the instantaneous values of various aircraft parameters. Early recorders were analog electromechanical devices which periodically marked, in analog form, the value of a given airplane parameter on a moving wire or other permanent storage medium. The time of occurrence of the parameter was also suitably scribed into the medium opposite the mark for the sensed parameter.

Subsequently, digital flight data recorders have been developed which operate by converting each analog aircraft parameter into a corresponding digital signal, and storing the digital signals on a permanent storage medium such as magnetic tape.

The numerous mechanical parts employed in the analog and digital type electromechanical flight data recorders have rendered such units expensive to construct and bulky in design, requiring periodic maintenance of the mechanical parts. In addition, extraction of the stored data from these data recorders requires physical removal of the storage medium.

The development of solid state memory devices, such as electrically erasable read-only memory, has led to the design of all solid state flight data recorders. The solid state flight data recorders commonly employ a data acquisition system (DAS) which receives and processes the various aircraft input signals to be monitored and stored under the control of a central processing unit (CPU). The analog signals are converted to digital signals by the DAS and, under CPU control, are passed over a data bus to the solid state memory devices. Programming within the CPU controls the processing of input airplane signals to corresponding digital signals through the DAS and the subsequent transference of these digital signals to controlled locations in the solid state memory.

The signals representative of monitored aircraft parameters are typically either discrete level signals or analog signals. Discrete signals are typically switch positions and produce either a high or a low level output depending upon the status of the particular switch. A typical example in an aircraft is a squat switch, which indicates whether or not a load is being borne by the landing gear. The analog signals may be either straight DC signals, DC ratiometric signals, synchro signals or AC ratiometric signals. The DC signals are static in nature, and generally range between a minimum and maximum value for the parameter being monitored. DC radiometric signals are DC signals having a ratio representative of the value of the parameter being sensed. A typical DC ratiometric signal is that produced by a potentiometer having a DC voltage applied across its resistive element, with the wiper position indicative of the level of the sensed parameter. Thus, the ratio of the wiper voltage to the voltage across the potentiometer's resistive element represents the level of the parameter being monitored.

Synchros are commonly employed to indicate the angle of a parameter. A synchro sensor is normally excited by two reference AC signals and outputs three active AC signals. The relative phasing and amplitude between the active AC signals and the reference signals indicate the angle of the synchro and, thus, the angle of the sensed parameter.

A typical AC ratiometric aircraft signal is that produced by a linear variable differential transformer (LVDT). LVDTs are commonly employed to indicate the relative position of aircraft control surfaces. Here, the ratio of the LVDT output sense AC signal to a reference AC signal is indicative of both total deflection and direction of deflection of the control surface.

To accurately collect data from synchro and ratiometric-type sensors, therefore, the DAS should simultaneously collect and hold each signal associated with the multisignal-type sensor.

Further, it is desirable to minimize the overhead on the CPU in its accessing of data as collected by the DAS. In prior art flight data recorder designs, the CPU sends a request to the DAS asking for the value of a given aircraft parameter and this parameter is then selected, processed, and analog-to-digital converted by the DAS which then signals the CPU that the requested information is available. Since a large number of airplane parameters may be monitored by the flight data recorder, constant requests by the CPU on the DAS significantly increases CPU overhead.

Further, it is desirable to conform the flight data recorder such that it is capable of being conveniently modified to operate in any one of several different types of aircraft. To this end, the DAS is preferably configured such that its inputs may be assigned by the CPU to handle any analog or discrete input signal. Further, the levels of the various signals at the inputs of the DAS must often be scaled for proper processing within the DAS. For example, inasmuch as all input signals are analog-to-digital (A/D) converted, the DAS typically includes a conventional A/D converter. The accuracy of an A/D converter is a function of the signal level applied at the input to the converter. To minimize A/D converter errors, therefore, it is essential that each aircraft parameter sensor signal be scaled before being applied to the A/D converter. In order to assure a universal flight data recorder design, the scaling factors applied to each input signal should be under CPU control.

SUMMARY OF THE INVENTION

The present invention, therefore, is directed to a data acquisition system for use in a flight data recorder. An aspect of the present invention is the ability of the data acquisition system to process a set of parameter sense signals in response to a single CPU request. In this way, integrity of multiple signal sensor data is assured and overhead on CPU operation is reduced.

A further aspect of the invention is the universal application of the present data acquisition system. Analog or discrete aircraft parameter signals may be assigned to any of the multiple data acquisition system inputs under CPU control. Further, the DAS is responsive to CPU control to vary the scaling applied to each input signal.

Briefly, according to the invention, a data acquisition system for an aircraft flight data recorder is responsive to a central processor unit (CPU) for selectively processing a plurality of input signals. The data acquisition system comprises a multiplexer which outputs selected sets of the input signals, with each selected input signal set being output responsive to a corresponding address command signal. Logic is responsive to a single command from the CPU for producing each address command signal. Each signal in a selected signal set is processed by provided processing means.

Preferably, the processing means includes gain controlled amplifiers which respond to gain control command signals from the CPU for amplifying each signal in a selected signal set by a predetermined gain factor. Track-and-hold circuitry tracks the value of each amplified signal in a selected signal set and, in response to a hold command signal, holds the instantaneous value of each amplified signal. An analog-to-digital converter converts each signal at its input to a corresponding digital signal at its output. A controller predeterminedly couples the instantaneous value of each signal in the selected signal set to the input of the analog-to-digital converter.

In addition, input scaling circuits may be provided for attenuating selected input signals by a predetermined scaling factor. The gain factors for the gain controlled amplifiers are selected such that each signal, after being attenuated in the input scaling circuit and amplified by the gain controlled amplifier has a level in a range selected to minimize analog-to-digital converter error.

Preferably, the data acquisition system includes digital memory for storing each analog-to-digital converted instantaneous value of a signal in a selected signal set. The controller produces an interrupt signal to the CPU upon all of the analog-to-digital converted instantaneous values of the signals in a selected signal set being stored in the digital memory.

Preferably, the logic circuit responds to a single CPU command signal to:

(a) produce a predetermined address command signal such that the multiplexer outputs the set of selected input signals, (b) produce predetermined gain control command signals such that each signal in a selected signal set is amplified by a predetermined gain factor, and (c) activate the controller such that the analog-to-digital converted instantaneous value of each signal in a selected signal set is loaded into the digital memory.

For applications wherein at least three of the input signals to the data acquisition system are the output signals from a synchro sensor, the logic circuit produces an address command signal causing the multiplexer to output the three synchro signals as a selected signal set.

In applications wherein at least one of the input signals is an AC ratiometric signal and at least one of the input signals is the reference AC signal for the AC ratiometric signal, the logic circuit produces an address command signal causing the multiplexer to output the AC ratiometric and reference AC signal as a selected signal set.

BRIEF DESCRIPTION OF THE DRAWINGS

FIGS. 4A-4F are detailed schematic diagrams showing the preferred construction of the data acquisition system.

DETAILED DESCRIPTION

Figure 1:
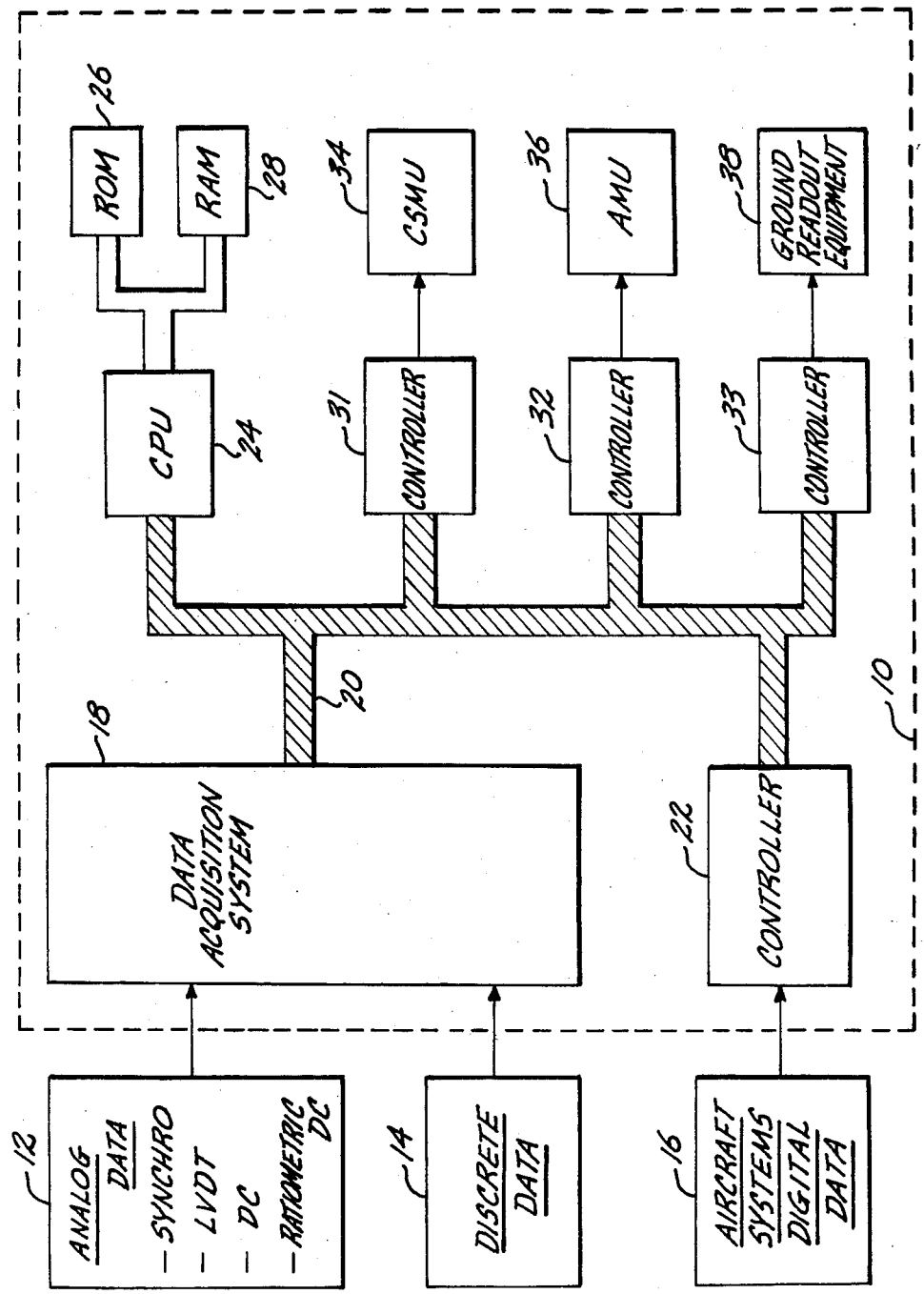
FIG. 1 is a block diagram illustrating the principal components of a solid state flight data recording system employing a data acquisition system.

FIG. 1 is a block diagram illustrating the principal components of a solid state flight data recording system, shown enclosed within dotted line 10. A flight data recorder is carried aboard an aircraft and systematically monitors and stores information related to aircraft parametric data. Such recorded data may be analyzed at a subsequent time to yield information related to the source of an aircraft mishap, or simply to provide a diagnostic and information tool as to the aircraft's performance.

The flight data recorder must be capable of receiving and processing three distinct types of parametric data. The first data grouping is analog data, indicated by block 12. The analog data may be any one of four distinct types. Information related to an angle, such as engine nozzle position, is commonly provided by a synchro sensor. Each synchro sensor typically provides three active signals $S_1$, $S_2$ and $S_3$ which are phase and amplitude related to a reference signal (commonly 400 Hz in aircraft). By processing the three active signals in the known manner, the angle of the parameter being monitored is derived.

A second type of analog data is AC ratiometric data. AC ratiometric data is commonly provided in aircraft by a sensor known as a linear variable differential transformer (LVDT). An LVDT is typically employed to monitor the position of an aircraft control surface. It is stimulated by an AC reference signal, and produces an AC output signal. The ratio of these two signals is related to relative movement between component parts of the LVDT and, thus, deflection of the control surface being monitored.

Finally, analog data signals may be either DC or ratiometric DC signals. The standard DC signals are voltage levels which vary within a defined range, the magnitude of which is indicative of the status of the parameter being monitored. Ratiometric DC signals are signal pairs, the ratio of which is indicative of the parameter being monitored. An example of a ratiometric DC signal is the output from a potentiometer. Typically, a voltage is applied across the resistive element of the potentiometer, this voltage constituting the first ratiometric signal. The wiper of the potentiometer is linked to the parameter being monitored such that it moves in response to parameter changes. As such, the ratio of the wiper voltage to the total resistive element voltage is indicative of the value of the parameter being sensed. Examples of ratiometric DC signals produced in aircraft are rate signals such as pitch, yaw and roll.

Discrete data, indicated by block 14, are signals which assume either a low or a high state in response to the status of the parameter being monitored. Such signals are, commonly, produced by switches, an example being the aircraft squat switch which produces a discrete output indicating whether or not the aircraft landing gear is under load.

Finally, the flight data recorder receives digital data, as indicated by block 16. The digital data originates from other systems within the aircraft. For example, digital information indicative of navigation information, as produced by aircraft onboard navigation computers, may be provided to the flight data recorder.

Both the analog data 12 and the discrete data 14 are processed within the flight data recorder through a data acquisition system 18. The function of the data acquisition system 18 is to receive each analog and discrete input signal and, under external control, sequentially convert each input signal to a corresponding digital signal. The digital signals are then output on a system bus 20. The data acquisition system 18 is described in detail hereafter.

A controller 22 receives the input digital data from the aircraft systems 16. The controller 22 provides any signal conditioning required and is responsive to external control to output the digital data on system bus 20.

Overall control for the flight data recorder is provided by a central processing unit (CPU) 24. Associated with the CPU 24 is a read-only memory (ROM) 26 which contains the programming used by the CPU 24. Also associated with CPU 24 is random access memory (RAM) 28 which is used by CPU 24 as required for temporary storage.

Also attached to the system bus 20 are three controllers 31-33. The first controller 31 connects to the crash survivable memory unit 34. The crash survivable memory unit 34 is a solid state memory storage which is housed within a container designed to survive an aircraft crash.

Connected to the output of controller 32 is an auxiliary memory unit 36. As with the crash survivable memory unit 34, the auxiliary memory unit 36 includes solid state, electronic memory. Electrically erasable programmable read-only memory (E$^2$PROM) may be used as the storage devices in either the crash survivable memory unit 34 or the auxiliary memory unit 36.

The output from controller 33 is adapted for connection to ground read out equipment 38. Once the aircraft has landed, information stored within the crash survivable memory unit 34 or the auxiliary memory unit 36 may be accessed by the ground read out equipment 38 and stored on magnetic tape or other permanent storage medium.

Operation of the flight data recorder, shown in FIG. 1, is understood as follows. The CPU 24, is response to its programming stored in ROM 26, sends commands to the data acquisition system 18 instructing that certain sets of analog data 12 or discrete data 14 be converted to corresponding digital signals. In addition, as will be discussed in more detail with respect to FIG. 2, commands from the CPU 24 cause the data acquisition system 18 to level adjust each of the processed analog signals. Once the set of analog or discrete data signals has been processed, the data acquisition system 18 notifies CPU 24 by an appropriate interrupt signal over an interrupt line associated with the system bus 20.

Similarly, the CPU 24 may access any digital data from the aircraft systems 16 via commands to the controller 22.

In response to the digital parametric signals from the data acquisition system 18 and the aircraft systems 16 through controller 22, the CPU performs any further signal processing required, such as converting synchro or LVDT signals to corresponding angle or position signals, respectively, thereafter loading the digital signals into either the crash survivable memory unit 34 or the auxiliary memory unit 36 via commands to the appropriate controllers 31, 32, respectively. Typically, parametric data relevant to system failures on the aircraft is loaded into the crash survivable memory unit 34, whereas data which is informational in nature is routed to the auxiliary memory unit 36.

Upon landing, the ground read out equipment 38 is attached to the system via controller 33 and, by appropriate commands to the CPU 24, data stored within the crash survivable memory unit 34 and the auxiliary memory unit 36 may be read out and loaded into permanent storage.

Figure 2:
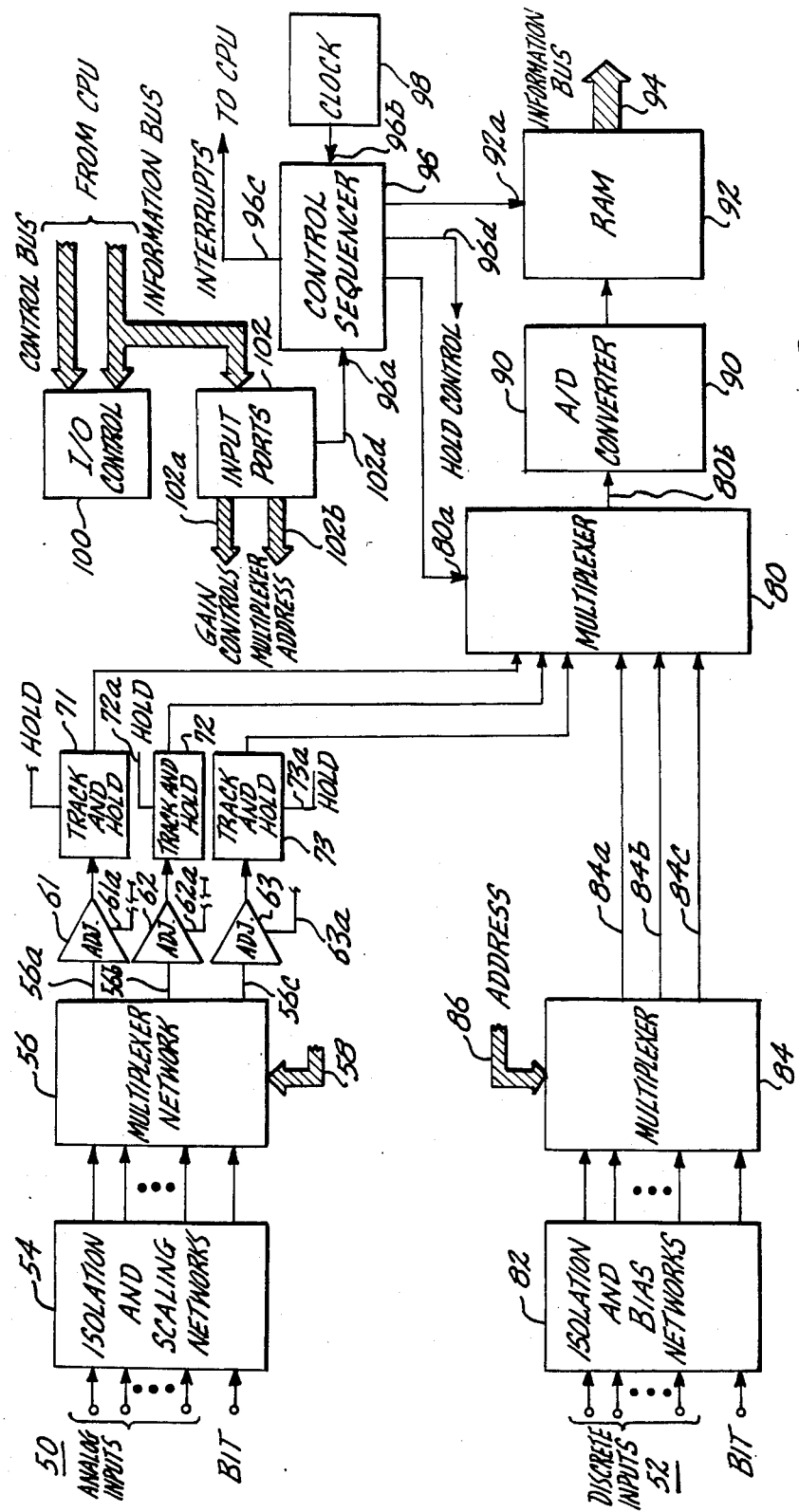
FIG. 2 is a block diagram illustrating the principal components of the preferred data acquisition system.

FIG. 2 is a detailed block diagram of the data acquisition system 18 as shown in FIG. 1. Input to the data acquisition system are a series of analog input signals, indicated generally at 50, and a series of discrete input signals, indicated generally at 52.

Each analog signal is fed over a line to an input of an isolation and scaling network 54. The input isolation and scaling networks are comprised of passive components, namely precision resistors and capacitors which scale each input signal to ensure feedback fault isolation and, further, to optimize the signal voltage range prior to analog-to-digital processing, as will be described hereafter.

Also applied as an input to the isolation and scaling networks 54 is a built-in test (BIT) signal. This signal is a predetermined, known voltage level signal which is applied to the system input and monitored at the output to identify any system processing errors.

Each scaled (attenuated) input analog signal is passed over a line to an input of a multiplexer network 56 comprised of three multiplexers. The multiplexer network 56 responds to a digital signal applied to its address bus 58 to selectively output a set of three input analog signals. The selected analog signals appear on multiplexer network output lines 56a-56c.

A feature of the data acquisition system is that in response to one command input from the CPU (FIG. 1), a predetermined set (here a set of three) of analog signals is selected for processing. In this way, overhead on the CPU is reduced (by reducing commands and interrupts between the CPU and the data acquisition system) and the phase integrity of synchro and AC ratiometric signals is preserved. That is, for analog input signals corresponding to the S1, S2 and S3 active synchro output signals, these three signals are selected as a set and, as such, are simultaneously processed by the data acquisition system, thereby eliminating errors due to monitoring the synchro lines at slightly different times. For LVDT signals, both the return signal and the reference signals are processed simultaneously, thereby also avoiding phase related errors. Also, for two LVDTs sharing a common reference signal, a set can include each LVDT signal and the single reference signal, thereby avoiding the need to access the reference signal twice.

Each output line 56a-56c from the multiplexer network 56 connects to the input of a gain controller amplifier 61-63, respectively. Each gain controlled amplifier 61-63 has a gain control input 61a-63a, respectively, and, in response to a command over its gain control input, each gain controlled amplifier 61-63 amplifies a signal at its input by a predetermined gain factor.

The amplified signals at the outputs of gain controlled amplifiers 61-63 are applied at the inputs to three track-and-hold circuits 71-73, respectively. Each track-andhold circuit 71-73 has a hold command input line 71a-73a, respectively. The track-and-hold circuits 71-73 operate to track the levels of the signals out of gain controlled amplifiers 61-63 until a hold command signal is received. Once a hold command signal is received, each track-and-hold circuit 71-73 produces at its output the held level of the signal at its input at the time of receipt of the hold command. The three held signal levels are applied via output lines from the track-and-hold circuits 71-73 to three inputs of a multiplexer 80.

Each of the discrete input signals 52 is carried over a line to an input of the isolation and bias networks 82. As with the isolation and scaling networks 54, the isolation and bias networks 82 ensure feedback fault isolation and, if required, input scale or input bias each discrete signal to make it compatible with subsequent data acquisition system processing circuitry.

Also applied as an input to the isolation and bias networks 82 is a built-in test (BIT) signal which is a predetermined level signal used to check the accuracy of system processing.

Each discrete input signal and the BIT signal are processed through the isolation and bias networks 82 and applied as an input to a multiplexer 84. Multiplexer 84 has an address bus input 86 and, in response to digital addresses on address bus 86, selects a set of three discrete input signals which appear on the multiplexer 84 output lines 84a-84c. The selected discrete signal set is applied to the remaining three inputs of the multiplexer 80.

The multiplexer 80, in response to an address command provided at its address input 80a, sequentially passes a selected signal at its input to the multiplexer output 80b. The output 80b of multiplexer 80 connects to the input of an analog-to-digital (A/D) converter 90. In the known manner, A/D converter 90 converts each signal applied at its input to a corresponding digital signal at its output.

Each digital signal appearing at the output of A/D converter 90 is applied to the input of a random access memory (RAM) 92. The RAM 92 responds to control signals at its control input 92a to load each digital signal at its input into an appropriate storage location. Further, upon receiving an appropriate command at its command input 92a, RAM 92 outputs its stored digital values on the system information bus 94 which connects to the CPU.

Control signals to the multiplexer 80 and the RAM 92 are provided by a control sequencer 96. Control sequencer 96 receives a control input signal at its input 96a and a clock signal, from a clock 98, at its clock input 96b. Also, control sequencer 96 is capable of producing an interrupt signal at its output 96c which leads to the CPU. In addition, the control sequencer 96 provides a hold control output 96d which is fed to the hold control inputs 71a-73a of the track-and-hold circuits 71-73, respectively.

Both the control bus and the information bus from the CPU are fed to the input/output (I/O) control circuitry 100 associated with the data acquisition system. Also, the CPU information bus is applied to the input of a set of input ports 102. The input ports 102 produce a set of gain control signals, on lines 102a, which are applied to the gain control inputs 61a-63a of the gain controlled amplifiers 61-63, respectively. Also appearing as an output of the input ports 102 on output lines 102b are the multiplexer address signals which are coupled to the multiplexers 56 and 84. A control line 102c from input ports 102 connects to input 96a of control sequencer 96. Finally, a control line 102d out of the input ports 102 is fed to the control input 96a of the control sequencer 96.

Operation of the data acquisition system shown in FIG. 2 is understood as follows.

The CPU accesses the data acquisition system by applying an appropriate address signal over the control bus which is recognized, and responded to by the I/O control 100. A CPU produced signal on the information bus is processed by the input ports 102 which produce an appropriate multiplexer address output on output lines 102b. In response to this address, the multiplexer networks 56, 84, select a set of three analog signals and three discrete signals, respectively. The selected set of three discrete signals are applied directly as inputs to multiplexer 80. The selected set of three analog signals, appearing on output lines 56a-56c of multiplexer network 56, are coupled as inputs to the gain controlled amplifiers 61-63. Each gain controlled amplifier 61-63 receives at its gain control input 61a-63a, respectively, a gain control signal as coupled from the information bus through input ports 102 and applied on output lines 102a. The accuracy of A/D converter 90 is dependent upon the level of the input signal. Thus, to minimize A/D errors, the CPU selects a gain for the gain controlled amplifiers 61-63 which, in association with the attenuation to each input signal provided by the isolation and scaling networks 54, level adjusts each analog signal for minimum A/D converter error.

A hold control signal at output line 96d from the control sequencer 96 causes the track-and-hold circuits 71-73 to output a held level of the gain factored analog signals. These held values appear at the input to multiplexer 80.

The control sequencer 96 receives a control signal at its control input 96a from the control output 102c of the input port 102 indicating that the CPU is requesting processed parametric data. In response, the control sequencer 96, at a rate determined by the clock 98, sequentially passes, via appropriate addresses to control input 80a, each signal at the input of multiplexer 80 to the multiplexer output line 80b where it is then A/D converted by converter 90. The corresponding digital signal out of converter 90 is then loaded into an address in RAM 92 determined by the control sequencer 96 produced signal at the control input 92a. Once the control sequencer 96 has determined that either a full set of selected analog signals, or a full set of discrete signals, has been fully processed and stored as digital signals in the RAM 92, the control sequencer 96 generates an interrupt signal at its output 96c indicating to the CPU that the data stored in the RAM 92 is available on the information bus 94.

Figure 3:
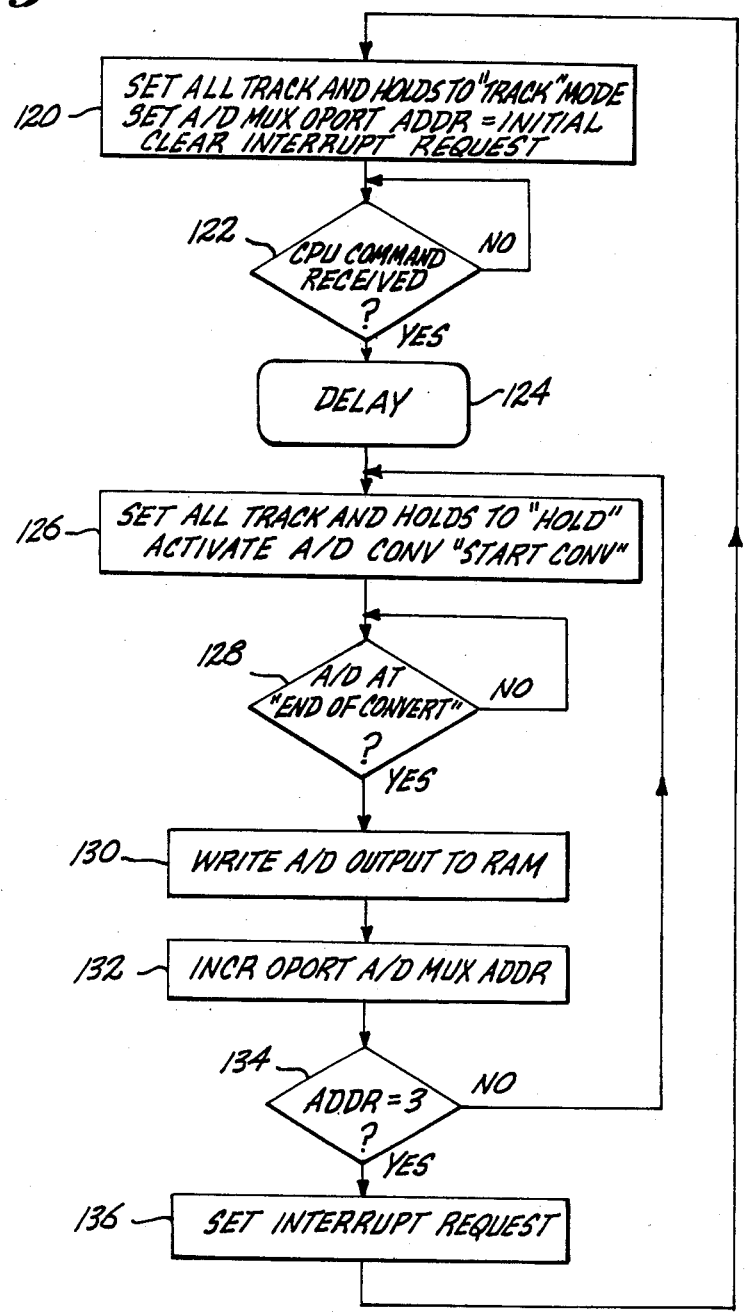
FIG. 3 is a logic flow diagram illustrating the sequential steps performed by the control sequencer of the preferred data acquisition system.
Figure 4A:
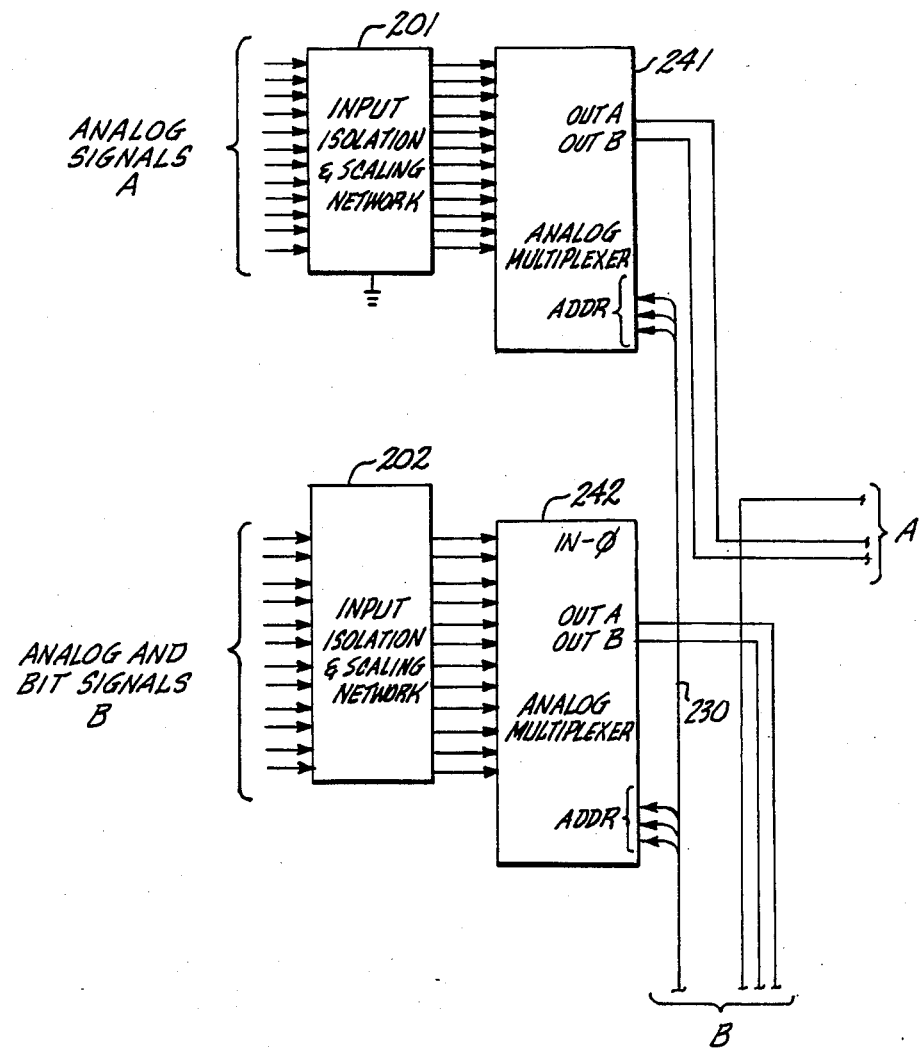
Figure 4C:
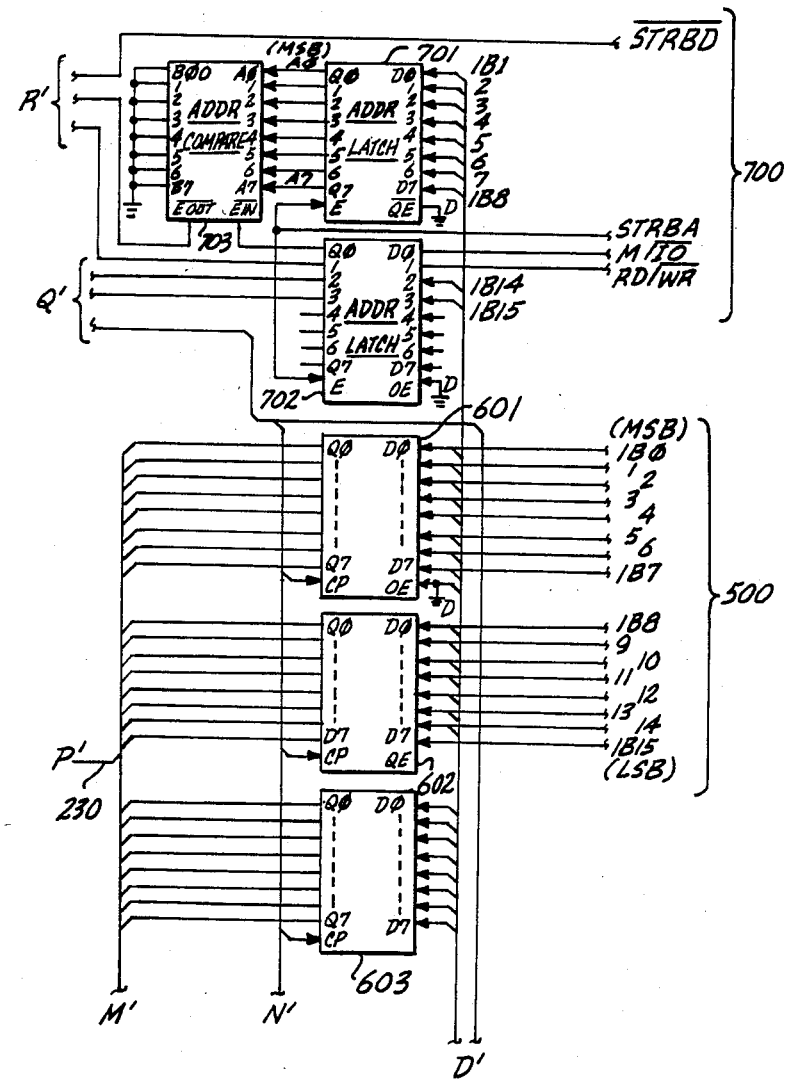
Figure 4D:
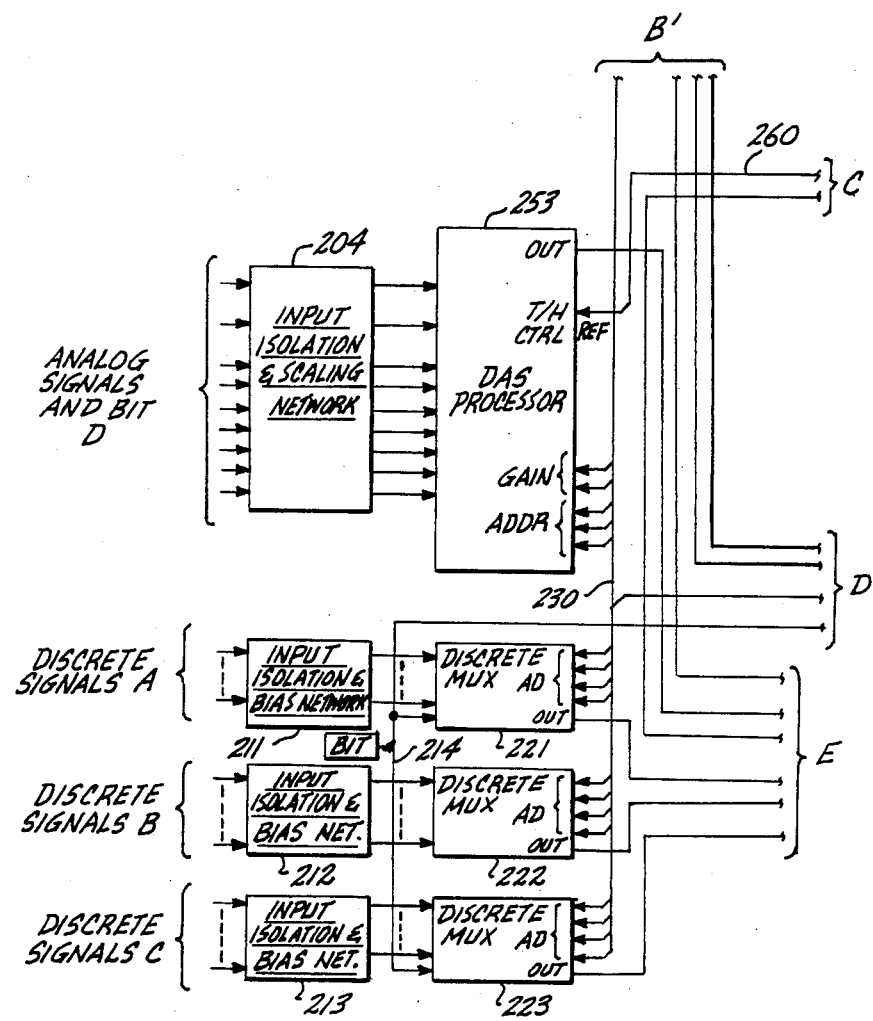
Figure 4E:
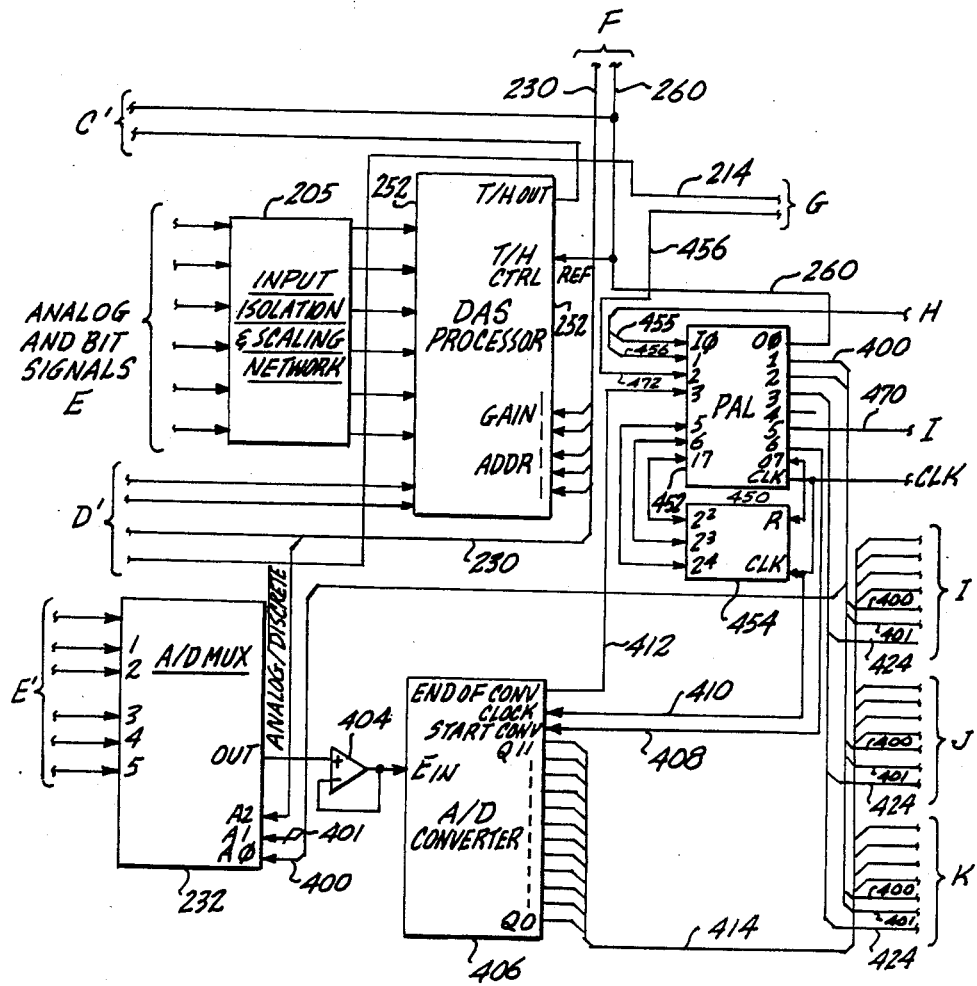
Figure 4F:
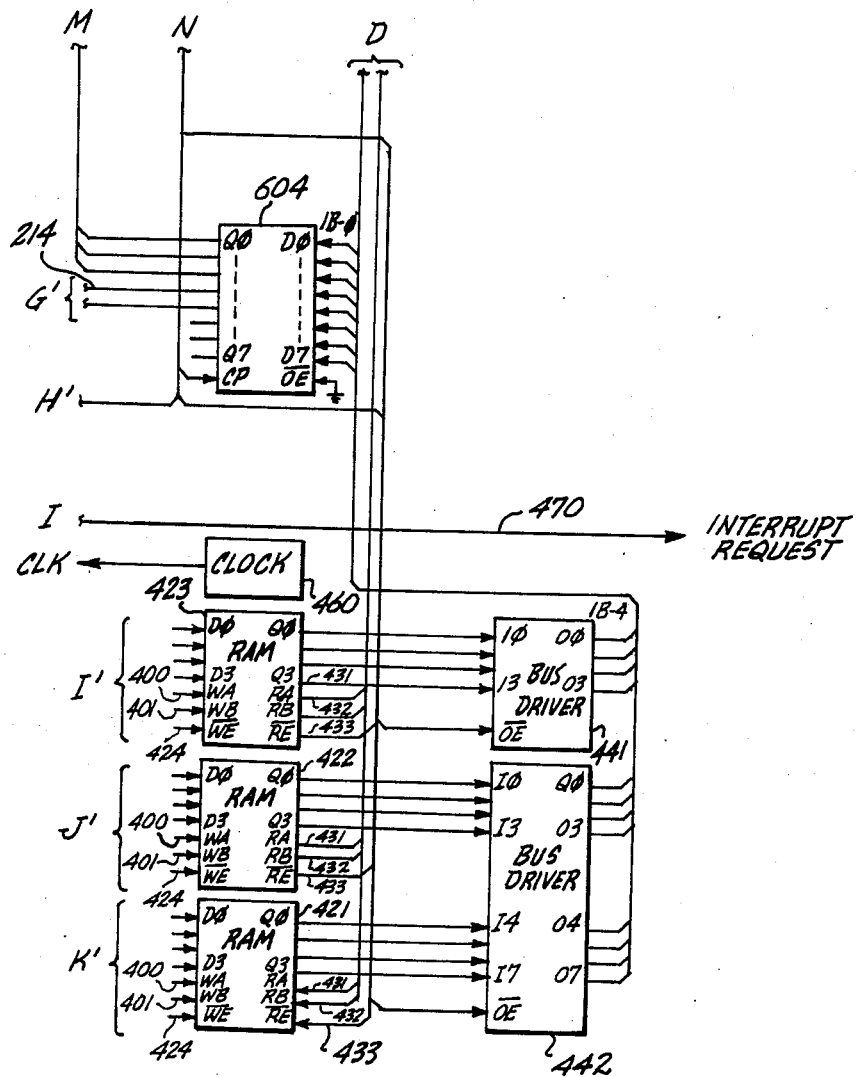

FIG. 3 is a logic flow diagram illustrating the sequential steps performed by the control sequencer 96. Initially, at block 120, all track-and-hold circuits are set in their track mode. Also, a control signal is applied to the address input 80a of the multiplexer 80 such that the first one of the various input signals to be processed is selected. Further, a signal is sent to the control input 92a of the RAM 92 such that the first signal out of the A/D converter 90 is loaded into the initial address in the RAM 92. Finally, any interrupt at output 96c is cleared.

At decision block 122, the control sequencer tests for the presence of a CPU command. If no command has been received, the control sequencer simply maintains all initial conditions.

Once a CPU command has been received by the control sequencer 96, a finite delay period is instituted at block 124. This finite delay period is to allow sufficient time for the track-and-hold circuits 71-73 to acquire the signals.

At block 126, upon completion of the finite delay period 124, all of the track-and-holds 71-73 are set to their "hold" mode. The A/D converter 90 is then activated to convert the first output from multiplexer 80 to a corresponding digital signal.

At decision block 128, the control sequencer tests for whether or not it has received an "end of convert" signal from the A/D converter 90. The A/D converter produces the "end of convert" signal to signify that its output digital word is valid. Absent the appropriate "end of convert" signal, the system merely waits. However, once the A/D "end of convert" signal is received, the control sequencer 96 responds at block 130 by writing the A/D digital output signal to the RAM 92.

At block 132, the address to RAM 92 at control input 92a is incremented, as is the address at input 80a, to the multiplexer 80. Then, at decision block 134, a determination is made as to whether or not a total of three signals has been stored in the RAM 92. If a total of three signals has not been stored, the system returns to block 126 to process the next selected signal. If, however, either all three analog or all three discrete signals have been processed and stored, and interrupt request is set at block 136 on line 96c to the CPU indicating that the RAM 92 is ready to output all three of its stored digital signals on the information bus 94.

The control sequencer 96 then returns to initialize block 120 awaiting a further CPU command.

Various features of the data acquisition system shown in FIG. 2 are of note. First, inasmuch as the system is capable of processing a set of three signals in response to each CPU command, and produces an interrupt signal to the CPU only upon the full digital conversion of three selected signals, commands and responses between the CPU and data acqustion system are reduced, thereby reducing overhead on the CPU. In addition, by processing signals in sets, errors, such as phasing errors which may be otherwise encountered in monitoring synchro and LVDT signals, may be eliminated simply by selecting as signal sets each synchro produced signal and each LVDT related signal. Further, inasmuch as the signal set to be processed by the data acquisition system is under full control of the CPU, as are the gain levels to be applied to each analog signal, the present data acquisition system is very flexible in application, and by simple software changes to the CPU may be adapted to different applications.

FIGS. 4A–4F are detailed schematic diagrams of the preferred embodiment of the data acquisition system. The various analog input signals to the system are divided into five groups, A-E. Each of the analog signal groups A-E is connected to the inputs of one of five input isolation and scaling networks 201-205, respectively. It should be understood that an input line pair is used to carry each differential analog signal. Each input isolation and scaling network 201-205 contains resistor networks which are designed to provide fault feedback current isolation to the input analog signals. In addition, each analog signal may be scaled in a voltage divider to ensure signal level compatibility with the remainder of the data acquisition system circuitry. In addition, built-in test (BIT) signals are applied at the inputs of input isolation and scaling networks 202, 203, 204 and 205. The BIT signals are predetermined DC reference levels which are processed through the system as parametric signals and used by the CPU to determine system fault conditions.

The discrete input signals are divided into three groups A-C. Each discrete signal group A-C is passed to the inputs of three input isolation and bias networks 211-213, respectively. The input isolation and bias networks 211-213 ensure full feedback isolation, bias level setting and filtering, so that the resulting processed discrete signals are compatible with the data acquisition system circuitry.

The output lines from each input isolation and bias network 211-213 are passed to the inputs of three discrete signal multiplexers 221-223, respectively. Also passed to an input of each discrete multiplexer 211-213 is a CPU produced BIT signal on line 214. In the illustrated embodiment of the invention, each input isolation and bias network 211-213 is capable of handling up to 16 input signals. Thus, the discrete signal multiplexers 221-223 are 16 channel-type discrete multiplexers. A commercially available multiplexer circuit suitable for use as each multiplexer 221-223 is the Harris Semiconductor type HI-506A-8.

Each of the discrete signal multiplexers 221-223 has four address inputs labelled "AD". The address inputs AD for each of the discrete signal multiplexers 221-223 are tied to a bus 230. As described hereafter, address command signals from the CPU are routed over the bus 230 to the address inputs AD of the discrete signal multiplexers 221-223 causing each discrete signal multiplexer 221-223 to output a selected one of its 16 inputs on its corresponding output terminal, labelled "OUT". The selected output signals from the discrete signal multiplexers 221-223 are passed to the number 3, 4 and 5 inputs, respectively, of an A/D multiplexer 232.

The outputs from the first two input isolation and scaling networks 201, 202 are passed to the inputs of a pair of dual, eight-channel multiplexers 241, 242, respectively. The dual, eight-channel multiplexers 241, 242, preferably comprised of commercially available type HI-507A-8 integrated circuits, each include three address input lines, labelled "ADDR" which connect to the bus 230. In response to address signals from the CPU on the bus 230, each multiplexer 241, 242 outputs a selected one of its input analog signals at its output lines labelled "OUT A" and "OUT B".

The selected signal output from the first dual, eight-channel multiplexer 241 is applied as an input to a first data acquisition system processor 251. Also applied as inputs to the first data acquisition processor 251 are the outputs from the third input isolation and scaling network 203.

The selected signal output from the second dual, eight-channel multiplexer 242 is fed to the input of the second digital acquisition processor 252. Also fed as inputs to the second data acqustion system processor 252 are the outputs from the fifth input isolation and scaling network 205.

The outputs from the fourth input isolation and scaling network 204 are fed to the inputs of a third data acquisition system processor 253.

The use of the dual, eight-channel multiplexers 241, 242 illustrates the convenient manner by which inputs to the data acquisition system may be expanded. By simply including additional multiplexers such as multiplexers 241, 242 and input isolation and scaling networks, such as networks 201, 202, a user may substantially increase the number of input signals which may be handled by the system.

Each one of the three data acquisition processors 251–253 includes a multiplexer for the input signals, under the control of an address signal on bus 230 applied to the "ADDR" inputs of each processor 251–253. In this way, each processor 251–253 selects one of its input signals for further processing.

The input signal selected by the multiplexer in each processor 251–253 is amplified in a gain controlled amplifier by a predetermined gain factor set by the CPU via a digital signal on the bus 230. This 2-bit gain control signal is applied to the inputs labelled "GAIN" in each of the three processors 251–253.

Each processor 251–253 also includes track-and-hold circuitry which tracks the values of the signals out of the gain controlled amplifiers and holds the instantaneous value of each amplified signal upon receipt of an appropriate signal at its track/hold control input, labelled "T/H CTRL". This control signal is provided over a control line 260 to each of the three processors 251–253. The held values out of the three processors 251–253 are provided at the outputs labelled "T/H OUT" and are applied, respectively, as the first three inputs to the A/D multiplexer 232.

Figure 5:
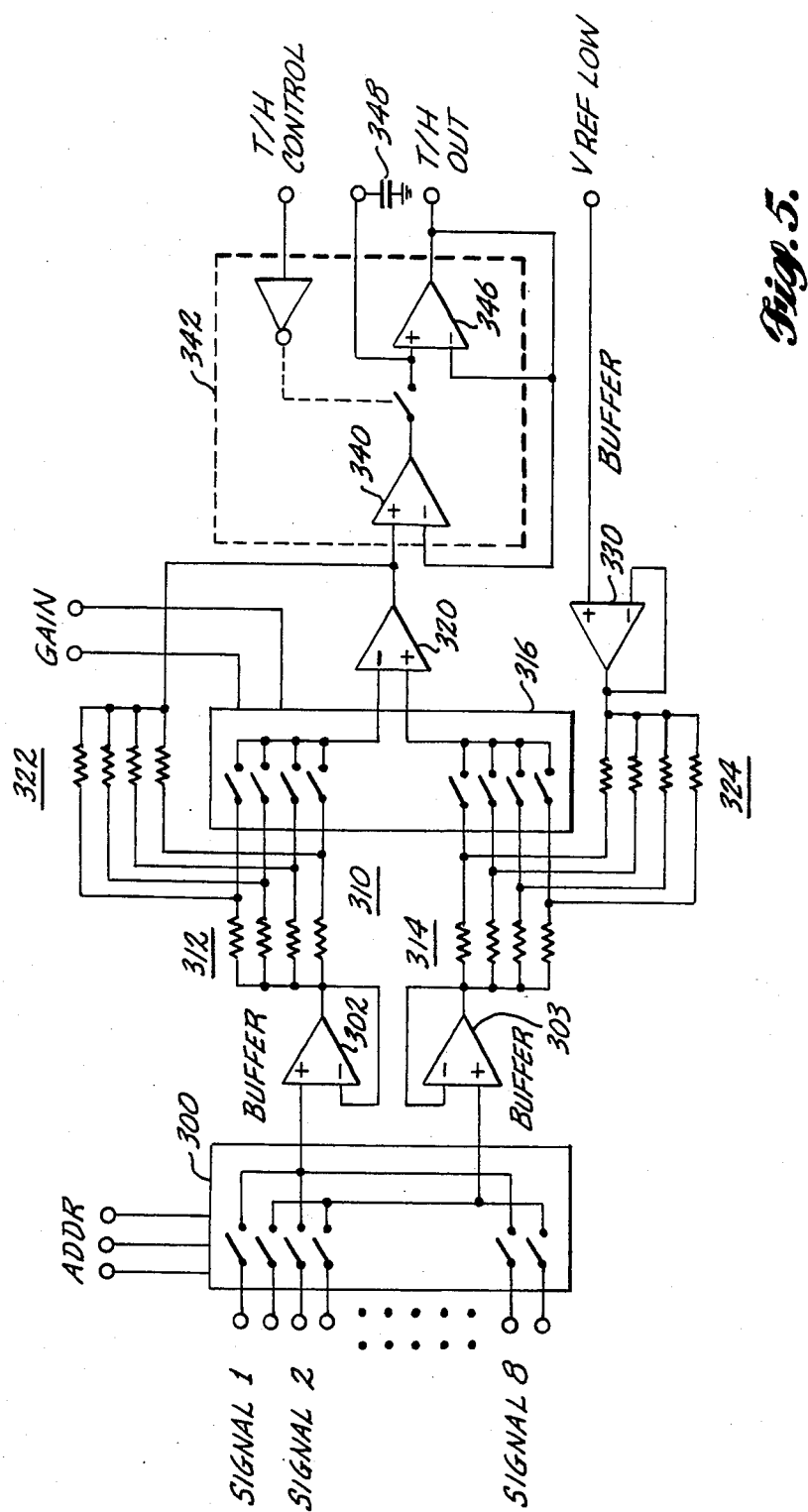
FIG. 5 is a detailed schematic diagram of the data acqusition signal processors used in the data acquisition system.

FIG. 5 is a detailed functional diagram illustrating the design of each of the processors 251–253. Each processor is capable of receiving up to eight input signals. These signals are applied to the inputs of a multiplexer 300. The multiplexer 300 responds to a 3-bit address signal at its "ADDR" input line to select one of the eight input signals. Each lead of the selected signal is passed to the noninverting input of one of a pair of buffer amplifiers 302, 303. The buffer amplifiers are connected in a unity gain configuration. As such, each input line is isolated from source resistances external to the processor, thereby preserving a high common mode rejection ratio. Also, the buffers provide a high input impedance for each of the signals.

The outputs from the buffer amplifiers 302, 303 are fed to the input of a gain controllable amplifier, indicated generally at 310. The gain controllable amplifier 310 is comprised of first and second sets 312, 314 of series input gain control resistors, the common connection of which connect to the outputs of buffer amplifiers 302, 303, respectively. A multiplexer 316, under the control of the 2-bit "GAIN" command from the CPU, connects a selected resistor in each series resistor bank 312, 314 to a corresponding input of an operational amplifier 320. A pair of parallel resistor banks 322, 324 connect in parallel from output to input of the operational amplifier 320 through the multiplexer 316. The low side of the signal is passed through a buffer amplifier 330, designed for unity gain, to maintain a high common mode rejection ratio.

In response to the 2-bit signal on the "GAIN" control input lines, the multiplexer 316 connects a selected one of the series input resistors 312, 314, and a corresponding one of the parallel resistors 322, 324 as a gain control circuit for operational amplifier 320. The resulting gain factor produced by the overall amplifier 310 is, thus, a function of the values of the resistors 312, 314, 322, and 324. In the preferred embodiment of the invention, the resistor values are selected such that gains of 1, 2, 4 or 8 are realized.

The output from the gain controllable amplifier 310 drives the buffer amplifier 340 of the track-and-hold circuit, indicated within the dotted line 342. Upon receipt of a "HOLD" signal at the "T/H CONTROL" input, the track-and-hold circuit 342 closes an internal switch 344 connecting the input signal to the input of a second amplifier 346 and to a holding capacitor 348. The output from amplifier 346 in the hold mode is the held level, on capacitor 348, of the input signal at the time a "hold" control signal was received. This signal is provided at the output of the track-and-hold circuit 342. With switch 344 open (as shown), the track-and-hold circuit 342 produces the buffered, gain controlled signal at its output labelled "T/H OUT".

In the preferred embodiment of the invention, the processors 251–253 are comprised of commercially available type HI-5900 devices.

Returning to FIGS. 4A–4F, the A/D multiplexer 232 selects one of its six input signals in response to a 3-bit signal at its address inputs, labelled "A0–A2." The A0, A1 lines are provided out of the control sequencer circuitry, on lines 400, 401, and select one of the three analog input signals and one of the three input discrete signals. The A2 input, taken off of bus 230, selects either an analog or a discrete signal.

The A/D multiplexer may be comprised of a commercially available type HI-508A8 device.

The selected output signal from the A/D multiplexer 232 is buffered through a unity gain amplifier 404 and passed to the input, labelled "$E_{IN}$", of an A/D converter 406. The A/D converter 406 responds to a "start convert" signal on input line 408 to analog-to-digital convert signals applied at the input of the converter 406. The conversion process takes place at the rate of a clock signal, provided on line 410. Upon completion of an analog-to-digital conversion, the converter 406 produces an "end of conversion" signal which appears on the output line 412. The A/D converter 406 is, in the preferred embodiment of the invention, a 12-bit converter, producing a 12-bit digital output Q0–Q11. The A/D converter 406 may be comprised of a commercially available type AD5215 device.

The 12-bit digital signal output from the A/D converter 406 is carried on a twelve line bus 414 to the inputs of three 4-bit by 4-bit random access memories (RAMS) 421–423 configured to form a 12-bit by 4-bit array capable of storing up to four 12-bit signals out of the A/D converter 406. Data is addressed into the RAMS 421–423 via write address lines 400, 401 provided out of the control sequencer. The control sequencer also provides a write enable signal on a line 424.

In turn, data is read out of the RAMS 421–423 under control of the CPU via read address lines 431, 432 and a read enable line 433. Output data from the RAMS 421–423 is buffered through bus drivers 441, 442.

The RAMS 421–423 may be comprised of commercially available type 52LS670 integrated circuits, whereas the bus drivers 441, 442 may be comprised of commercially available type 54LS373 integrated circuits.

The control sequencer, indicated generally at 450, is comprised of a programmable array logic device 452 and a 5-bit binary counter 454. The control sequencer 450 responds to an input/output signal on lines 455, 456 to produce the hold command applied to the processors 251–253 on line 260. After a finite time period, determined by the 5-bit binary counter 454 counting clock pulses from a clock 460, the control sequencer 450 activates its output line 408 to institute the analog-to-digital conversion process. Once the conversion process has been completed for the selected three signal set, the control sequencer 450 responds to an end of conversion signal on line 412 to produce an interrupt request on output line 470.

The programmable array logic device 452 may be comprised of a commercially available type MMI16R8-4 device, whereas the 5-bit binary counter 454 may be comprised of a 4024B device.

The CPU supplies information to, and extracts data from the data acquisition system via a 16 line information bus 500. Connected to the data bus 500 are the outputs from the bus drivers 441, 442. In this way, parametric data stored within the RAMS 421-423 may be output to the CPU.

Input commands from the CPU on the information bus 500 are passed to four input ports 601-604. Upon receipt of a clock pulse at its CP input, each input port 601-604 passes the signals at its input D0-D7 to its output lines Q0-Q7. Most of the data on the output lines Q0-Q7 of the input ports 601-604 is directed to the individual processors 251-253 and provides each processor with address information for selecting a desired input signal and gain information for multiplying the selected signal by a selected gain factor. In addition, certain output lines from the input ports 601-604 are fed to the discrete multiplexers 221-223 to select the desired set of three discrete signals. Also, special function lines are provided. For example, line 230 indicates to the A/D multiplexer 232 whether the analog signal set or the discrete signal set is to be selected. In addition, line 214 carries the CPU produced BIT signal to the discrete multiplexers 211-213.

The inlet ports 601-604 may be comprised of commercially available type 54LS374 integrated circuits.

The CPU accesses the data acquisition system by means of a control bus 700. The control bus 700 connects to input/output logic comprised of first and second address latches 701, 702, an address compare circuit 703 and an address decode circuit 704. The eight most significant bits of the information bus 500 are fed to the eight data inputs D0-D7 of the first address latch 701. The two least significant bits of the information bus are fed to the D2, D3 inputs, respectively, of the second address latch 702. Applied to the D0 input of address latch 702 is a CPU produced signal indicating whether a memory instruction address or an input/output command is being applied on the information bus. The D1 input of the second address latch 702 receives a CPU produced signal indicating whether the CPU is to read information off the information bus, or write information for the data acquisition system on the information bus. The first and second address latches 701, 702 are enabled by a CPU signal strobe A. The address decoder 704 is enabled by a strobe D signal from the CPU.

The Q0-Q7 outputs from the first address latch 701 feed to the address inputs of the address compare circuit 703. The B0-B7 addresses of address compare circuit 703 are all tied to a low level. The input "$E_{in}$" to the address compare circuit 703 is from the Q0 output of the second address latch 702. The output "$E_{out}$" from the address compare circuit 703 feeds to the first input A1 of the address decoder 704. The Q1 output from the second address latch 702 feeds to the first input A0 of the address decoder 704, with the Q2 and Q3 outputs from the second address latch 702 feeding to the second A1 and first A0 inputs to address decoder 704.

The address latches 701, 702 may be comprised of commercially available type 54LS374 integrated circuits. The address comparator 703 may be comprised of a commercially available type 25LS2521 integrated circuit, with the address decoder being comprised of a type 54LS138 integrated circuit.

The basic function of the input/output logic is to compare the address latched through the first latch address 701 to a reference address in the address comparator 703. If the address comparator recognizes the address from the CPU as being the address of the data acquisition system, an output to the address decoder 704 results in the production of control signals to the data acquistion system. These control signals include a clock pulse which allows data to be input via input ports 601-604 and "read" signals, allowing data to be output from the RAMS 421-423 over the information bus 500. In addition, the input/output logic produces control signals on lines 455, 456, causing the control sequencer to institute the conversion and storing process.

In summary, a data acquisition system for an aircraft flight data recorder has been described which is capable of processing and converting a set of input signals in response to a single CPU request, thereby reducing overhead on the CPU. The disclosed data acquistion system is universal in design in that it allows full CPU control of the input signals to be processed and, in addition, CPU control of the gain factors applied to the input signals.

While a preferred embodiment of the invention has been described in detail, it should be apparent that many modifications and variations thereto are possible, all of which fall within the true spirit and scope of the invention.

The embodiments of the invention in which an exclusive property or privilege is claimed are defined as follows:

1. A data acquistion system for an aircraft flight data recorder responsive to a central processor unit (CPU) for processing a plurality of input signals to provide a digitally encoded signal representative of a selected set of input signals each time the CPU provides a simple command signal, said digitally encoded signal being used by said CPU for generation of recorded flight data information, said data acquisition system comprising:
   multiplexing means for outputting said selected set of said input signals, each selected input signal set being output responsive to a corresponding address command signal;
   logic means responsive to said single command from said CPU for producing each address command signal; and
   processing means for processing each signal in a selected signal set to supply said digitally encoded signal representative of said selected set of input signals.

2. The data acquisition system of claim 1, wherein said processing means comprises:
   gain controlled amplifier means responsive to gain control command signals from said CPU for amplifying each signal in a selected signal set by a predetermined gain factor;
   track-and-hold circuit means for tracking the values of each amplified signal in a selected signal set and, responsive to a hold command signal, holding the instantaneous value of each amplified signal;

analog-to-digital converter means for converting each signal at its input to a corresponding digital signal at its output;

controller means for predeterminedly coupling the instantaneous value of each signal in the selected signal set to the input of said analog-to-digital converter means; and means for supplying said corresponding signals at the output of said analog-to-digital converter means as said digitally encoded signal representative of said selected set of input signals.

3. The data acquisition system of claim 2, wherein each predetermined gain factor is selected such that the resulting amplified signal coupled to the input of said analog-to-digital converter is in a range selected to minimize analog-to-digital converter means error.

4. The data acquisition system of claim 2, further comprising:

input scaling circuit means for attenuating selected input signals by a predetermined scaling factor; and wherein said gain factors for said gain controlled amplifiers are selected such that each signal, after being attenuated in said input scaling circuit means and amplified by said gain controlled amplifier, is in a range selected to minimize analog-to-digital converter means error.

5. The data acquisition system of claim 2, wherein said means for supplying said signals at the output of said analog-to-digital converter means as said digitally encoded signal includes digital memory means for storing each analog-to-digital converted instantaneous value of a signal in a selected signal set; and wherein said controller means produces an interrupt signal to said CPU upon all of the analog-to-digital converter signals in a selected signal set being stored in said digital memory means.

6. The data acquisition system of claim 5, wherein said logic means responds to a single CPU command signal to:

(a) produce a predetermined address command signal such that said multiplexing means outputs said set of selected input signals, (b) produce predetermined gain control command signals such that each signal in a selected signal set is amplified by a predetermined gain factor, and (c) activate said controller means such that the analog-to-digital converted instantaneous value of each signal in a selected signal set is loaded into said digital memory means.

7. The data acquisition system of claim 1, wherein at least three of said input signals are the three analog output signals of a synchro sensor and wherein said logic means produces an address command signal causing said multiplexing means to output said three synchro signals as a selected signal set.

8. The data acquisition system of claim 1, wherein at least one of said input signals is an AC ratiometric signal and at least one of said input signals is the reference AC signal for said AC ratiometric signals and wherein said logic means produces an address command signal causing said multiplexing means to output said AC ratiometric and reference AC signals as a selected signal set.

9. A data acquisition system for an aircraft flight data recorder of the type that selectively records flight data information, said flight data acquisition system being responsive to a central processor unit (CPU) for selectively processing multiple input signals and supplying to said CPU for utilization in selective recording of flight data information a digital signal respresentative of a selected set of said input signals, said data acquisition system comprising:

multiplexing means responsive to applied address command signals for outputting selected sets of said input signals;

signal level control means for predeterminedly controlling the level of each signal in a selected signal set, said signal level control means including gain controlled amplifier means responsive to applied gain control command signals for amplifying each signal in a signal set by a predetermined gain factor;

means responsive to an applied hold command signal to hold the instantaneous level of each amplified signal in a signal set;

analog-to-digital converter means for converting the held signal levels into said digital signal for utilization by said CPU; and controller means for predeterminedly coupling each held signal level to the input of said analog-to-digital converter means.

10. The data acquisition system of claim 9, wherein said signal level control means includes input attenuator means for attenuating each of said input signals by a predetermined factor.

11. The data acquisition system of claim 9, wherein said signal level control means controls the level of each signal to a range selected to reduce analog-to-digital converter means error.

12. The data acquisition system of claim 10, wherein said signal level control means controls the level of each signal to a range selected to reduce analog-to-digital converter means error.

13. The data acquisition system of claim 9, further comprising:

digital memory means for storing each analog-to-digital converted instantaneous value of a signal in a selected signal set; and wherein said controller means produces an interrupt signal to said CPU upon all of the analog-to-digital converted signals in a selected signal set being stored in said digital memory means.

14. The data acquisition system of claims 13, further comprising:

logic means responsive to a single CPU command signal for:

(a) producing said address command signals applied to said multiplexing means for selection of said selected sets of selected input signals, (b) producing said applied gain control command signals such that each signal in a selected signal set is amplified by a predetermined gain factor, and (c) activating said controller means such that the analog-to-digital converted instantaneous value of each signal in a selected signal set is loaded into said digital memory means.

15. The data acquisition system of claim 14, wherein at least three of said input signals are the output signals from a synchro sensor and wherein said logic means produces an address command signal causing said multiplexing means to output said three synchro signals as a selected signal set.

16. The data acquisition system of claim 14, wherein at least one of said input signals is an AC ratiometric signal and at least one of said input signals is the reference AC signal for said AC ratiometric signals and wherein said logic means produces an address command signal causing said multiplexing means to output said AC ratiometric and reference AC signals as a selected signal set.

17. A data acquisition system for an aircraft flight data recorder having a plurality of analog input signals and a plurality of discrete input signals and being responsive to a central processor unit (CPU) for selectively processing said analog and discrete input signals into digital signals for transmission to said CPU in response to a command signal supplied by said CPU, the data acquisition system comprising:

first multiplexing means responsive to a first address command signal for outputting a selected set of said analog signals;

processing means for supplying a set of signal levels representative of the value of each signal in a selected signal set of said analog signals at a predetermined sampling time;

second multiplexing means responsive to a second address command signal for outputting a selected set of said discrete signals;

third multiplexing means responsive to a control sequence signal for selectively outputting one of said first multiplexing means processed signal set and said second multiplexing means output signal set;

analog-to-digital converter means for converting each signal out of said third multiplexing means to a digital signal;

digital memory means for storing each analog-to-digital converter means produced signal;

control sequencer means for producing control sequence signals to sequentially analog-to-digital convert the output signals from said third multiplexing means, said control sequencer means further providing an interrupt signal to said CPU responsive to said digital memory means having stored each analog-to-digital converted output from said third multiplexer means; and logic means for supplying at least one of said first and second address command signals in response to each said command signal applied by said CPU.

18. The data acquisition system of claim 17, wherein said processing means comprises:

gain controlled amplifier means responsive to gain control command signals from said CPU for amplifying each signal in a selected signal set by a predetermined gain factor;

track-and-hold circuit means for tracking the values of each amplified signal in a selected signal set and, responsive to a hold command signal, holding the instantaneous value of each amplified signal.

19. The data acquisition system of claim 18, wherein each predetermined gain factor is selected such that the resulting amplified signal coupled to the input of said analog-to-digital converter is in a range selected to minimize analog-to-digital converter means error.

20. The data acquisition system of claim 18, further comprising:

input scaling circuit means for attenuating selected input signals by a predetermined scaling factor; and wherein said gain factors for said gain controlled amplifiers are selected such that each signal, after being attenuated in said input scaling circuit means and amplified by said gain controlled amplifier, is in a range selected to minimize analog-to-digital converter means error.

21. The data acquisition system of claim 18, wherein said logic means is responsive to a single CPU command signal for:

(a) producing a predetermined first address command signal such that said first multiplexing means outputs said selected set of analog signals, (b) producing said applied gain control command signals such that each analog signal in said selected set is amplified by a predetermined gain factor, and (c) activating said control sequencer means such that said control sequencer supplies said hold command signal and activates said third multiplexing means such that the analog-to-digital converted signals out of the third multiplexing means are loaded into said digital memory means.

22. The data acquisition system of claim 21, wherein at least three of said analog input signals are the output signals from a synchro and wherein said logic means produces an address command signal causing said first multiplexing means to output said three synchro signals as a selected set.

23. The data acquisition system of claim 21, wherein at least one of said analog input signals is an AC ratiometric signal and at least one of said analog input signals is the reference AC signal for said AC ratiometric signals and wherein said logic means produces an address command signal causing said first multiplexing means to output said AC ratiometric and reference AC signals as a selected set.

24. The data acquisition system of claim 17, further comprising:

test circuitry means including means for applying a predetermined analog signal and a predetermined discrete signal as inputs to the data acquisition system, means for causing said predetermined analog and discrete signals to be processed through said data acquisition system such that digital signals corresponding to said predetermined analog and discrete signals are stored in said digital memory means, and means for reading said digital signals corresponding to said predetermined analog and discrete signals out of said digital memory means, comparing said digital signals to the predetermined value and indicating a fault condition in response to a predetermined discrepancy therebetween.

25. A data acquisition system for an aircraft flight data recorder responsive to a central processor unit (CPU) for processing a plurality of input signals to provide a digitally encoded signal representative of a selected set of input signals for utilization by the CPU each time the CPU provides a single command signal, said data acquisition system comprising:

multiplexing means for outputting said selected set of said input signals in response to an applied address command signal;

logic means responsive to said single command signal from said CPU for applying said address command signal to said multiplexing means;

processing means for processing each signal in a selected signal set to provide said digitally encoded word representative of said selected set of input signals, said processing means including:

(a) gain controlled amplifier means responsive to an applied gain control command signal for amplifying each signal in a selected signal set by a predetermined gain factor;

(b) track-and-hold circuit means for tracking the values of each amplified signal in a selected signal set and, in response to an applied hold command signal, holding the instantaneous value of each amplified signal;

(c) analog-to-digital converter means for converting each signal at its input to a corresponding digital signal at its output;

(d) controller means for coupling the instantaneous value of each signal in the selected signal set to the input of said analog-to-digital converter means; and (e) means for supplying said corresponding signals supplied by said analog-to-digital converter means as said digitally encoded signal representative of said selected set of input signals.

26. The data acquisition system of claim 25, further comprising:

input scaling circuit means for attenuating selected input signals by a predetermined scaling factor; and wherein said gain factors for said gain controlled amplifiers are selected such that each signal after being attenuated in said input scaling circuit means and amplified by said gain controlled amplifier, is in a range selected to minimize analog-to-digital converter means error.

27. The data acquisition system of claim 25, wherein at least three of said input signals are the three analog output signals of a synchro sensor and wherein said logic means produces an address command signal causing said multiplexing means to output said three synchro signals as a selected signal set.

28. The data acquisition system of claim 25, wherein at least one of said input signals is an AC ratiometric signal and at least one of said input signals is the reference AC signal for said AC ratiometric signal and wherein said logic means produces an address command signal causing said multiplexing means to output said AC ratiometric and reference AC signals as a selected signal set.

29. The data acquisition system of claim 25, wherein said means for supplying said corresponding signals supplied by said analog-to-digital converter means as said digitally encoded signal representative of said selected set of input signals includes digital memory means for storing each corresponding signal supplied by said analog-to-digital converter; and wherein said controller means produces an interrupt signal to said CPU upon all of said corresponding digital signals supplied by analog-to-digital converter means being stored in said digital memory means.

30. The data acquisition system of claim 29, wherein said logic means corresponds to a single CPU command signal to:

(a) produce a predetermined address command signal such that said multiplexing means outputs said set of selected input signals, (b) produce predetermined gain control command signals such that each signal in a selected signal set is amplified by a predetermined gain factor, and (c) activates said controller means such that the analog-to-digital converted instantaneous value of each signal in a selected signal set is loaded into said digital memory means.

* * * * *

UNITED STATES PATENT AND TRADEMARK OFFICE
CERTIFICATE OF CORRECTION

PATENT NO. : 4,656,585
DATED : April 7, 1987
INVENTOR(S) : Edward A. Stephenson

It is certified that error appears in the above-identified patent and that said Letters Patent is hereby corrected as shown below:

Column 5, line 48, delete "is" and insert therefor — in —.
Column 6, line 60, delete "controller" and insert therefor — controlled —.
Column 9, line 30, delete "and" and insert therefor — an —.
Column 14, line 16, delete "acquistion" and insert therefor — acquisition —.
Column 14, line 27, delete "acquistion" and insert therefor — acquisition —.
Column 14, line 40, delete "acquistion" and insert therefor — acquisition —.
Column 15, line 35, delete "converter" and insert therefor — converted —.
Column 18, line 9, insert — signal — before "set".

Signed and Sealed this

Eleventh Day of August, 1987

Attest:

DONALD J. QUIGG

Attesting Officer

Commissioner of Patents and Trademarks